(12) United States Patent
Jeong et al.

(10) Patent No.: US 10,521,259 B2
(45) Date of Patent: Dec. 31, 2019

(54) DEVICE AND METHOD FOR MONITORING RESOURCES IN FULL VIRTUALIZATION SYSTEM

(71) Applicant: SOOSAN INT CO., LTD., Seoul (KR)

(72) Inventors: Hoi Chan Jeong, Seoul (KR); Kwan Jae Lee, Seoul (KR); Seung Hyun Seo, Seoul (KR); Kyoung Tae Kang, Seoul (KR)

(73) Assignee: SOOSAN INT CO., LTD. (KR)

( * ) Notice: Subject to any disclaimer, the term of this patent is extended or adjusted under 35 U.S.C. 154(b) by 239 days.

(21) Appl. No.: 15/524,592

(22) PCT Filed: Nov. 5, 2015

(86) PCT No.: PCT/KR2015/011821
§ 371 (c)(1),
(2) Date: May 4, 2017

(87) PCT Pub. No.: WO2016/072760
PCT Pub. Date: May 12, 2016

(65) Prior Publication Data
US 2018/0285138 A1    Oct. 4, 2018

(30) Foreign Application Priority Data
Nov. 5, 2014 (KR) .................. 10-2014-0152869

(51) Int. Cl.
*G06F 9/46* (2006.01)
*G06F 9/455* (2018.01)
(Continued)

(52) U.S. Cl.
CPC .......... *G06F 9/45558* (2013.01); *G06F 3/061* (2013.01); *G06F 3/0643* (2013.01);
(Continued)

(58) Field of Classification Search
CPC .... G06F 9/45558; G06F 3/0673; G06F 11/30; G06F 12/14
See application file for complete search history.

(56) References Cited

U.S. PATENT DOCUMENTS 4,677,546 A * 6/1987 Freeman ............. G06F 12/1491
711/201
5,657,445 A * 8/1997 Pearce ................ G06F 12/1491
710/37
(Continued)

FOREIGN PATENT DOCUMENTS

| JP | 2934709 | 8/1999 | ............. G06F 12/00 |
| KR | 20080089002 | 10/2008 | ............. G06F 12/00 |

(Continued)

OTHER PUBLICATIONS

International Preliminary Report on Patentability issued in application No. PCT/KR2015/011821, dated May 9, 2017 (14 pgs).
(Continued)

*Primary Examiner* — Camquy Truong
(74) *Attorney, Agent, or Firm* — Hayes Soloway P.C.

(57) ABSTRACT

The present invention relates to a device and a method for monitoring resources in a full virtualization system, the device and method generating a file table by parsing file information, generating a memory table when a memory is allocated, and then determining whether to execute a command by a process unit with reference to the file table and the memory table when the command is generated from a guest operating system or an application such that a virtual machine monitor is requested to execute the command.

13 Claims, 6 Drawing Sheets

(51) Int. Cl.
*G06F 12/14* (2006.01)
*G06F 11/30* (2006.01)
*G06F 3/06* (2006.01)
*G06F 12/109* (2016.01)

(52) U.S. Cl.
CPC .......... *G06F 3/0664* (2013.01); *G06F 3/0673* (2013.01); *G06F 11/30* (2013.01); *G06F 12/14* (2013.01); *G06F 12/1483* (2013.01); *G06F 12/109* (2013.01); *G06F 2009/45579* (2013.01); *G06F 2009/45583* (2013.01); *G06F 2009/45591* (2013.01); *G06F 2212/1052* (2013.01); *G06F 2212/251* (2013.01); *G06F 2212/657* (2013.01)

(56) References Cited

U.S. PATENT DOCUMENTS

| | | | |
|---|---|---|---|
| 8,352,694 B2 | 1/2013 | Heo et al. | 711/163 |
| 8,930,968 B2 | 1/2015 | Moon et al. | G06F 9/45558 |
| 9,384,209 B2 | 7/2016 | Kim et al. | G06F 17/30233 |
| 9,405,904 B1* | 8/2016 | Fang | H04L 63/00 |
| 2008/0065667 A1* | 3/2008 | Hopkins | G06F 16/1865 |
| 2011/0179417 A1* | 7/2011 | Inakoshi | G06F 9/45558 718/1 |
| 2013/0275701 A1* | 10/2013 | Symes | G06F 12/145 711/163 |

FOREIGN PATENT DOCUMENTS

| | | | |
|---|---|---|---|
| KR | 20110095051 | 8/2011 | G06F 13/20 |
| KR | 101072807 | 10/2011 | G06F 12/12 |
| KR | 20140074608 | 6/2014 | G06F 15/16 |

OTHER PUBLICATIONS

International Search Report and Written Opinion issued in application No. PCT/KR2015/011821, dated Feb. 16, 2016 (17 pgs).

* cited by examiner

| Process information | File Information (I-Node) | Access Right |
|---|---|---|
| ALL | 1, 2, 3 | Read/Write |
| A, B | 7 | Read |
| ALL | 9, 10, 11 | Hidden |
| C | 8, 12, 13, 14 | Read/Write |

FIG. 6

| Virtual Machine Information | Memory Area Information | Process Information |
|---|---|---|
| GUEST A | 6, 7, 8 | OS |
| GUEST A | 1, 2 | A |
| GUEST A | 3 | B |
| GUEST A | 4, 5 | C |
| GUEST B | 10 | OS |

DEVICE AND METHOD FOR MONITORING RESOURCES IN FULL VIRTUALIZATION SYSTEM

TECHNICAL FIELD

At least one example embodiment relates to monitoring resources in a full virtualization system, and more particularly, to monitoring an access to a file and controlling an access from a virtual machine process based on a file unit by verifying a preset access right for each file.

TECHNICAL FIELD

A lexical meaning of "virtualization" is defined as an "act of processing something unreal or ambiguous based on assumption that something unreal or ambiguous is a fact or an entity present in reality.

Herein, virtualization technology refers to "technology capable of installing and using a computer operating system without affecting a system structure or hardware".

The virtualization technology refers to technology proposed by IBM in 1970 ties to reduce a space of a main frame and cost at that time. However, the virtualization technology is currently in the spotlight by providing compatibility, flexibility, and security in addition to the cost saving effect. The virtualization technology may be applicable to various fields, such as a server virtualization for cloud computing, a desktop virtualization, a mobile virtualization, and the like.

A virtualization may be variously classified based on a configuration method and, generally, may be classified into a full virtualization and a Para virtualization.

The full virtualization refers to virtualization technology that virtualizes hardware and thus, does not require modification of a kernel.

On the contrary, the Para virtualization refers to virtualization technology that partially virtualizes hardware and needs to modify a guest operating system kernel to fit for an interface required by a virtual machine monitor (VMM).

The virtualization technology is used due to its security, which is based on a relatively high isolation feature of virtualization. In general, a virtualization environment includes a virtual machine and a virtual machine monitor or a hypervisor configured to manage the virtual machine. Each virtual machine is present in an isolated space. In particular, although a threat occurs in a virtual machine, the thread does not affect other virtual machines, excluding the corresponding virtual machine, and a virtual machine monitor.

However, security solutions used in an existing physical machine in a virtualization system have some constraints and a repetition rate of security threat is on the significant increase.

The security solutions have some constraints in the virtualization system since a plurality of operating systems is installed in a single virtualization system.

If hackers attack to access data at an operating system level using one of the operating systems installed in the virtualization system, it may be difficult to prevent the attack.

Accordingly, there is a need for technology capable of effectively monitoring and blocking an access to data.

DETAILED DESCRIPTION

Technical Subject

At least one example embodiment provides an apparatus and method for monitoring resources in a full virtualization system.

At least one example embodiment also provides an apparatus and method for monitoring an access to a file and controlling an access from a virtual machine process based on a file unit by verifying a preset access right for each file in a full virtualization system.

At least one example embodiment also provides technology for generating a file table in which an access right is set for each file by parsing in advance file information, and controlling an access to a file by determining whether the file is accessible by referring to the file table in response to an occurrence of a file input/output (I/O) command at a virtual machine process level.

At least one example embodiment also provides technology for generating a file table in which an access right is set for each file by parsing in advance file information, generating a memory table that includes an allocated memory area and process information when a memory is allocated, and controlling whether to execute a command by referring to the file table and the memory table in response to an occurrence of the command at a virtual machine process level.

Solution

According to an example embodiment, there is provided a method of monitoring resources in a full virtualization system, the method including generating a file table by parsing file information; requesting a virtual machine monitor to execute a file input/output (I/O) command in response to an occurrence of the file I/O command in a guest operating system or an application; and verifying whether a file requested by the file I/O command is accessible by referring to the file table.

Here, the verifying may include emulating the file I/O command to a format that is verifiable by the virtual machine monitor through an emulator.

Here, the file information may be at least one of path information of the file, a block number, and i-node information.

Here, the file table may include the file information and a right to access each piece of the file information.

The method of monitoring resources in the full virtualization system may further include executing the file I/O command when the file requested by the file I/O command is verified to be accessible.

Also, the method of monitoring resources in the full virtualization system may further include blocking an access when the file requested by the file I/O command is verified to be inaccessible.

Here, the blocking may include processing the file requested by the file I/O command to be displayed as a bad sector, to be displayed as "0", or to represent a protection area.

The method of monitoring resources in the full virtualization system may further include updating the file table in response to an occurrence of at least one of addition of the file, deletion of the file, change of the file, and change of an access right.

According to another example embodiment, there is provided a method of monitoring resources in a full virtualization system, the method including generating a file table by parsing file information; generating a memory table when allocating a memory; requesting a virtual machine monitor to execute a command in response to an occurrence of the command in a guest operating system or an application; verifying a memory area that the command refers to and verifying a process allocated to the verified memory area from the memory table; and verifying whether the process has a right to execute the command by referring to the file table.

Here, the file information may be at least one of path information of the file, a block number, and i-node information.

Here, the file table may include the file information, accessible process information, and an access right.

Here, the memory table may include virtual machine information, process information, and the memory area allocated to the process.

The method of monitoring resources in the full virtualization system may further include executing the command when the process is verified to have the right to execute the command.

Also, the method of monitoring resources in the full virtualization system may further include blocking an access when the process is verified to not have the right to execute the command.

Here, the blocking may include processing the file requested by the file I/O command to be displayed as a bad sector, to be displayed as "0", or to represent a protection area.

Also, the method of monitoring resources in the full virtualization system may further include updating the file table in response to an occurrence of at least one of addition of the file, deletion of the file, change of the file, change of an access right, and change of accessible process information.

Also, the method of monitoring resources in the full virtualization system may further include updating the memory table in response to allocation, change, and retrieval of the memory area.

According to an example embodiment, there is provided an apparatus for monitoring resources in a full virtualization system, the apparatus including a file generator configured to generate a file table by parsing file information; a virtual machine process configured to request a virtual machine monitor to execute a file input/output (I/O) command in response to an occurrence of the file I/O command in a guest operating system or an application; and the virtual machine monitor configured to verify whether a file requested by the file I/O command is accessible by referring to the file table.

Here, the virtual machine process may further include an emulator configured to emulate the file I/O command to a format that is verifiable by the virtual machine monitor, and the virtual machine monitor may emulate the file I/O command to a format that is verifiable by the virtual machine monitor through the emulator.

Here, the file information may be at least one of path information of the file, a block number, and i-node information.

Here, the file table may include the file information and a right to access each piece of the file information.

Here, the virtual machine monitor may be configured to execute the file I/O command when the file requested by the file I/O command is verified to be accessible.

Here, the virtual machine monitor may be configured to block an access when the file requested by the file I/O command is verified to be inaccessible.

Here, the virtual machine monitor may be configured to process the file requested by the file I/O command to be displayed as a bad sector, to be displayed as "0", or to represent a protection area.

Here, the file parser may be configured to update the file table in response to an occurrence of at least one of addition of the file, deletion of the file, change of the file, and change of an access right.

According to another example embodiment, there is provided an apparatus for monitoring resources in a full virtualization system, the apparatus including a file parser configured to generate a file table by parsing file information; a virtual machine monitor configured to generate a memory table when allocating a memory; and a virtual machine process configured to request the virtual machine monitor to execute a command in response to an occurrence of the command in a guest operating system or an application. The virtual machine monitor is configured to verify a memory area that the command refers to, to verify a process allocated to the verified memory area from the memory table, and to verify whether the process has a right to execute the command by referring to the file table.

Here, the file information may be at least one of path information of the file, a block number, and i-node information.

Here, the file table may include the file information, accessible process information, and an access right.

Here, the memory table may include process information and the memory area allocated to the process.

Here, the virtual machine monitor may be configured to execute the command when the process is verified to have the right to execute the command.

Here, the virtual machine monitor may be configured to block an access when the process is verified to not have the right to execute the command.

Here, the virtual machine monitor may be configured to process the file requested by the file I/O command to be displayed as a bad sector, to be displayed as "0", or to represent a protection area.

Here, the file parser may be configured to update the file table in response to an occurrence of at least one of addition of addition of the file, deletion of the file, change of the file, change of an access right, and change of accessible process information.

Here, the virtual machine monitor may be configured to update the memory table in response to allocation, change, and retrieval of the memory area.

Effect

Example embodiments relate to technology for generating a file table by parsing file information, and verifying whether a file requested by a file input/output (I/O) command is accessible by referring to the file table when a file I/O command occurs in a guest operating system or an application and a virtual machine monitor receives a request for executing the command. Thus, it is possible to monitor and control an access from a virtual machine process based on a file unit.

Also, example embodiments relate to technology for generating a file table by parsing file information, generating a memory table when allocating a memory, and determining whether a file is executable based on a process unit by referring to the file table and the memory table when a command occurs in a guest operating system or an application and a virtual machine monitor receives a request for executing the command. Thus, a full virtualization system may monitor and control resources based on a process unit.

BEST MODE

Other aspects and features will be apparent from the following example embodiments, which are illustrated in the accompanying figures.

The example embodiments are described with reference to the accompanying drawings. In the description of example embodiments, detailed description of known related structures or functions will be omitted when it is deemed that such description will cause ambiguous interpretation of the present disclosure.

However, the present disclosure is not limited to or restricted by the example embodiments. Like drawing reference numerals refer to like elements.

Hereinafter, an apparatus and method for monitoring resources of a guest operating system in a full virtualization system according to an example embodiment is described with reference to FIGS. 1 through 8.

Figure 1:
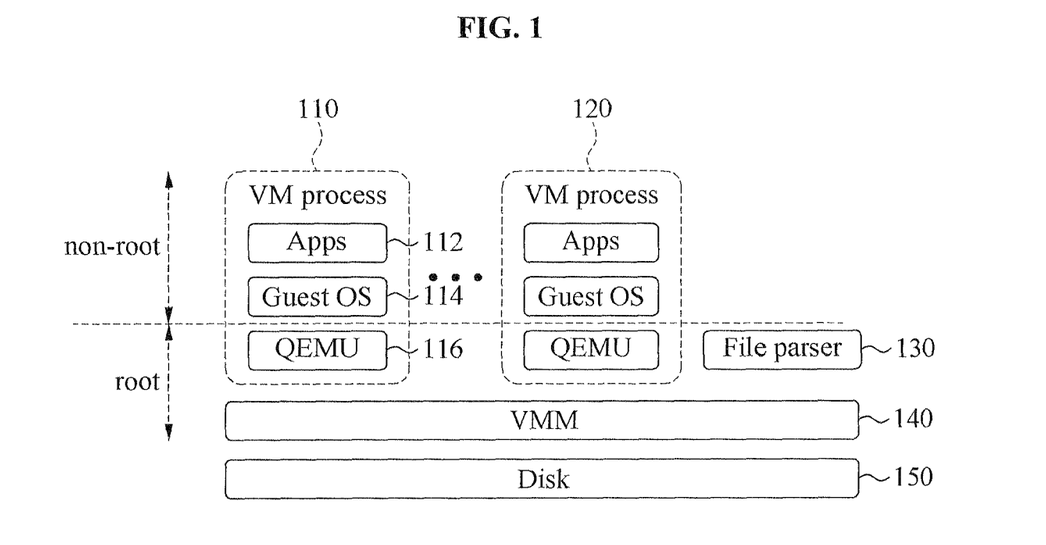
FIG. 1 is a diagram illustrating a configuration of a full virtualization system configured to monitor disk resources according to an example embodiment.

FIG. 1 is a diagram illustrating a configuration of a full virtualization system configured to monitor disk resources according to an example embodiment.

Referring to FIG. 1, the full virtualization system includes a virtual machine (VM) processes 110 and 120, a file parser 130, a virtual machine monitor (VMM) 140, and a disk 150. Here, the virtual machine process 110 may include an application (app) 112, a guest operating system (OS) 114, and an emulator (quick emulator (QEMU)) 116.

The file parser 130 generates a file table by parsing file information stored on the disk 150.

Here, the file information may be one of path information of a file, a block number, and i-node information. The file table may be configured in a format of FIG. 2.

Figure 2:
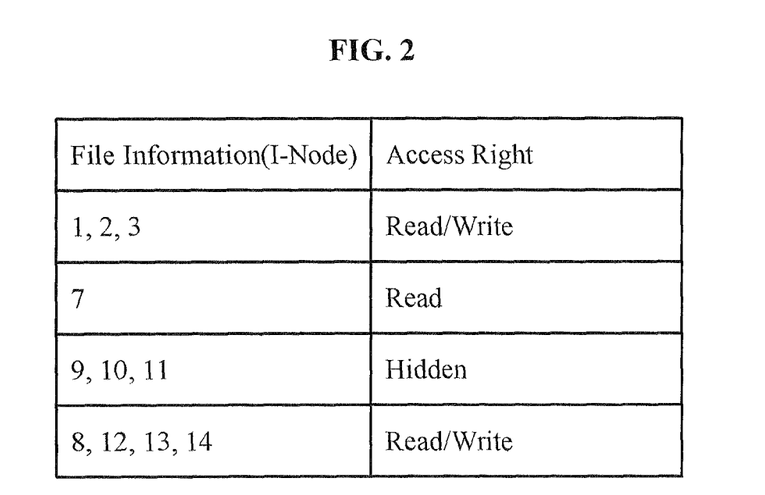
FIG. 2 illustrates an example of a file table generated to manage disk resources in a full virtualization system according to an example embodiment.

FIG. 2 illustrates an example of a file table generated to manage disk resources in a full virtualization system according to an example embodiment.

Referring to FIG. 2, the file table may include file information and a right to access each piece of the file information. FIG. 2 illustrates a case in which the file information is an i-node. The file information corresponds to identification information of blocks that constitute a file.

Based on the file table of FIG. 2, a guest operating system or an application executed in a virtual machine process may read and write a file including blocks #1, 2, and 3, may read only a file including a block #7, and may block an access to a file including blocks #9, 10, and 11, and may read and write a file including blocks #8, 12, 13, and 14.

The file parser 130 may update the file table in response to an occurrence of at least one of addition of a file, deletion of the file, change of the file, and change of an access right.

In the meantime, the file parser 130 may be configured as a separate apparatus, may be included in each emulator 116, and may be included in the virtual machine monitor 140.

In response to an occurrence of a file input/output (I/O) command or receiving the file I/O command from the application 112, the guest operating system 114 requests the virtual machine monitor 140 to execute the file I/O command.

The emulator 116 emulates the file I/O command to a format that is verifiable by the virtual machine monitor 140.

The virtual machine monitor 140 verifies whether the file I/O command is accessible to a file desired to be accessed by referring to file table.

In detail, when the file I/O command is received from the guest operating system 114 that is included in the virtual machine process 110, the virtual machine monitor 140 requests the emulator 116 to emulate the file I/O command. When the emulated file I/O command is received from the emulator 116, the virtual machine monitor 140 verifies an access right corresponding to a file requested by the file I/O command from the file table.

When the file requested by the file I/O command is accessible as a result of verifying the access right through the file table, the virtual machine monitor 140 executes the file I/O command. The virtual machine monitor 140 provides the result to the guest operating system 114.

When the file requested by the file I/O command is inaccessible as a result of verifying the access right through the file table, the virtual machine monitor 140 blocks an access.

Here, as a blocking method, the virtual machine monitor 140 may process the file requested by the file I/O command to be displayed as a bad sector, to be displayed as "0", or to represent a protection area.

Hereinafter, a method according to an example embodiment configured as FIG. 1 is described with reference to FIG. 3.

Figure 3:
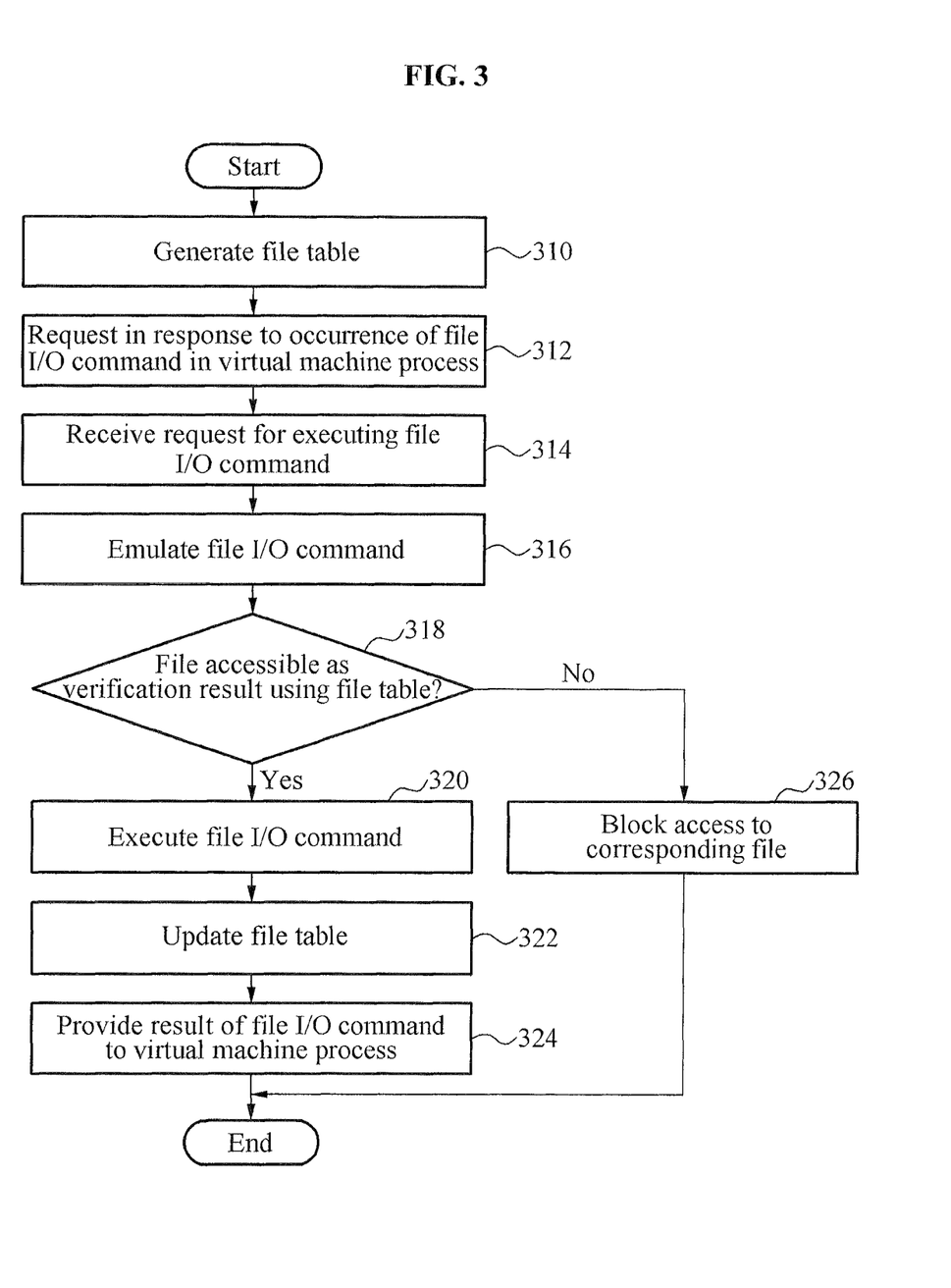
FIG. 3 is a flowchart illustrating a process of monitoring disk resources in a full virtualization system according to an example embodiment.

FIG. 3 is a flowchart illustrating a process of monitoring disk resources in a full virtualization system according to an example embodiment.

Referring to FIG. 3, in operation 310, the full virtualization system generates a file table by parsing file information of files pre-stored on a disk.

In operation 312, the full virtualization system requests a virtual machine monitor to execute a file I/O command in response to an occurrence of the file I/O command in a guest operating system or an application included in a virtual machine process of the full virtualization system.

When a request for executing the file I/O command is received in operation 314, the virtual machine monitor of the full virtualization system emulates the file I/O command to a format that is verifiable by the virtual machine monitor through an emulator in operation 316.

In operation 318, the virtual machine monitor of the full virtualization system verifies whether the file requested by the file I/O command is accessible by verifying an access right corresponding to the requested file by referring to the file table.

When the file requested by the file I/O command is verified to be accessible in operation 318, the virtual machine monitor executes the file I/O command in operation 320.

In operation 322, a file parser or the virtual machine monitor updates the file table in response to an occurrence of at least one of addition of the file, deletion of the file, change of the file, and change of the access right by the file I/O command.

In operation 324, the virtual machine monitor provides a result of the file I/O command to the guest operating system of the virtual machine process.

When the file requested by the file I/O command is verified to be inaccessible in operation 318, the virtual machine monitor blocks an access to the corresponding file in operation 326.

As a method of blocking the access, the virtual machine monitor may process the file requested by the file I/O command to be displayed as a bad sector, to be displayed as "0", or to represent a protection area.

Figure 4:
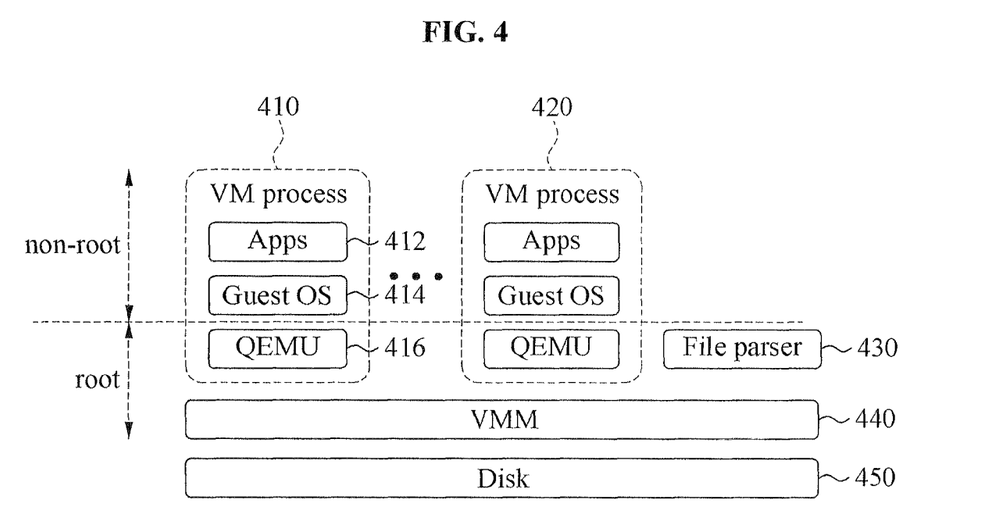
FIG. 4 is a diagram illustrating a configuration of a full virtualization system configured to monitor resources of a disk and a memory according to an example embodiment.

FIG. 4 is a diagram illustrating a configuration of a full virtualization system configured to monitor resources of a disk and a memory according to an example embodiment.

Referring to FIG. 4, the full virtualization system includes virtual machine (VM) processes 410 and 420, a file parser 430, a virtual machine monitor (VMM) 440, and a disk 450. Here, the virtual machine process 410 may include an application (app) 412, a guest operating system 414, and an emulator (quick emulator (QEMU)) 416.

The file parser 430 generates a file table by file information stored on the disk 450.

Here, the file information may be one of path information of a file, a block number, and i-node information. The file table may be configured in a format of FIG. 5.

Figure 5:
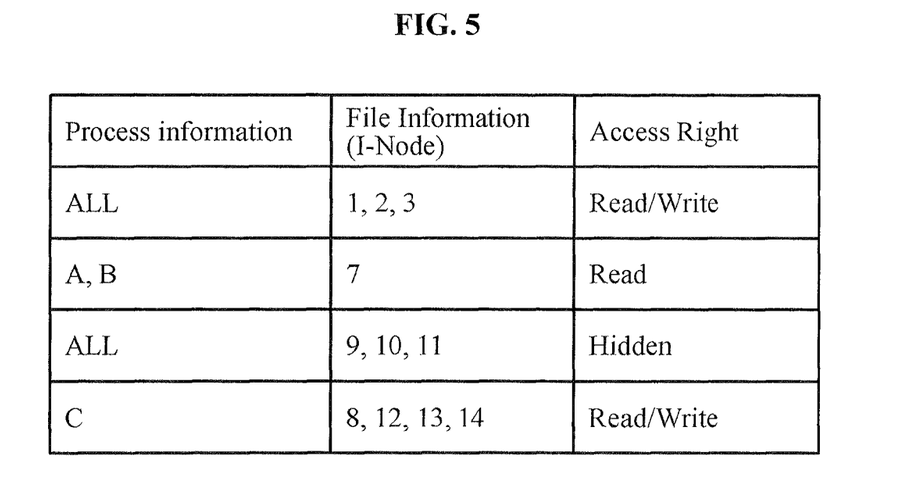
FIG. 5 illustrates an example of a file table generated to manage disk resources in a full virtualization system according to an example embodiment.

FIG. 5 illustrates an example of a file table generated to manage disk resources in a full virtualization system according to an example embodiment.

Referring to FIG. 5, the file table may include process information, file information, and access right information. FIG. 5 illustrates a case in which the process information is information indicating a target process and the file information is an i-node. The file information corresponds to identification information of blocks that constitute a file.

Based on the file table of FIG. 5, all of the processes may read write a file including blocks #1, 2, and 3. Processes A and B may read only a file including a block #7. All of the processes may block an access to a file including blocks #9, 10, and 11. Process C may read and write a file including blocks #8, 12, 13, and 14.

The file parser 430 may update the file table in response to an occurrence of at least one of addition of a file, deletion of the file, change of the file, and change of an access right.

In the meantime, the file parser 430 may be configured as a separate apparatus, may be included in each emulator 416, and may be included in the virtual machine monitor 440.

When a command having no right occurs or when a command having no right is received from the application 412, the guest operating system 414 requests the virtual machine monitor 440 to execute the command.

That is, when the guest operating system 414 or the application 412 being executed in the guest operating system 414 is to execute the command having no right, the virtual machine monitor 440 executes the command in lieu thereof.

The emulator 416 emulates the command to a format that is verifiable by the virtual machine monitor 440.

When the received command needs to be emulated, the virtual machine monitor 440 may request the emulator 416 to emulate the command.

When the application 412 and the guest operating system 414 executed in the virtual machine process are executed in the guest operating system 414, the virtual machine monitor 440 may allocate a memory and may generate allocated memory information as a memory table and manage the memory table.

Figure 6:
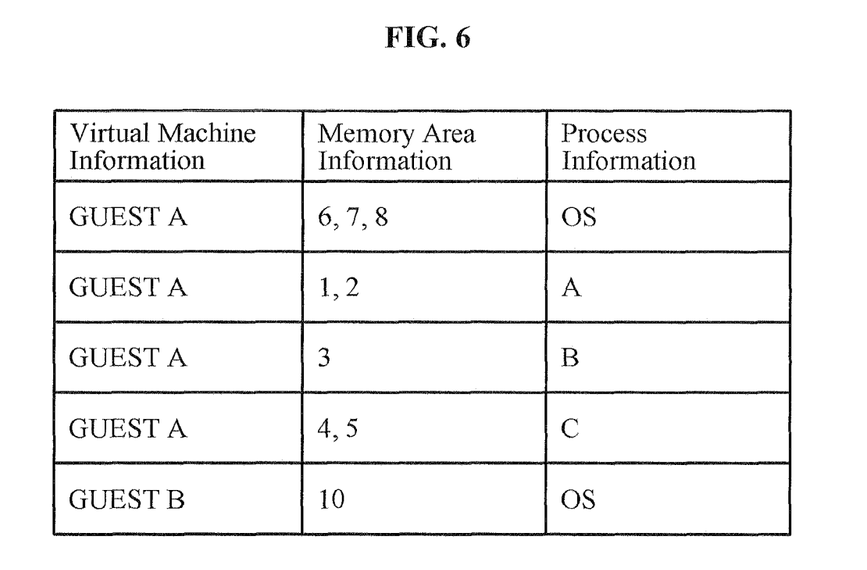
FIG. 6 illustrates an example of a memory table generated to manage memory resources in a full virtualization system according to an example embodiment.

FIG. 6 illustrates an example of a memory table generated to manage memory resources in a full virtualization system according to an example embodiment.

Referring to FIG. 6, the memory table may include virtual machine information, process information, and a memory area allocated to a process.

Figure 7:
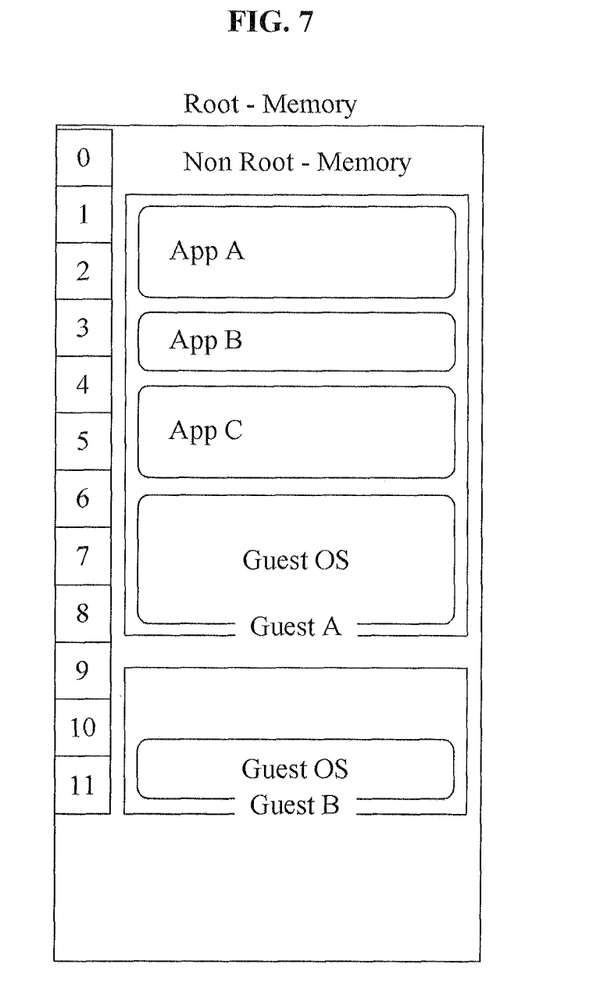
FIG. 7 illustrates a format of a memory allocated based on the memory table of FIG. 6.

FIG. 7 illustrates a format of a memory allocated based on the memory table of FIG. 6.

Referring to FIG. 7, similar to the memory table of FIG. 6, it can be verified that 1 to 8 of a memory are allocated to a guest machine process A.

Here, 1 and 2 of the memory is allocated to a process A, 3 of the memory is allocated to a process B, 4 and 5 of the memory are allocated to a process C, and 6, 7 and 8 of the memory are allocated to the guest operating system 414.

The virtual machine monitor 440 determines whether a command is executable by referring to a memory area that the command refers to, the memory table, and the file table.

In detail, the virtual machine monitor 440 verifies the memory area that the command refers to, verifies a process allocated to the verified memory area from the memory table, verifies a right to access a corresponding file for each process by referring to the file table, and verifies whether the process has a right to execute the command.

Hereinafter, a method of verifying, by the virtual machine monitor 440, the memory area that the command refers to is described. For example, if the command is a read command, it follows as:

read (block #7, memory 1)

The above command is a command to read content stored on a block 7 of a disk to a number 1 memory area.

write (block #9, memory 5)

The above command is a command to store content included in a number 5 memory area on a block 9 of the disk.

In the aforementioned read command, the memory area is the number 1 memory area. In the aforementioned write command, the memory area is the number 5 memory area.

Whether the read command and the write command are executable may be verified by referring to the file table of FIG. 5 and the memory table of FIG. 6.

It can be verified from the memory table that the process A of the virtual machine process A is a process allocated to the number 1 memory area corresponding to the memory area of the read command. It can be verified from the file table that the block #7 of the file desired to be read by the read command has a read access right with respect to the process A.

Accordingly, it can be verified from the file table of FIG. 5 and the memory table of FIG. 6 that read (block #7, memory 1) is an executable command.

As another example, it can be verified from the memory table that the process C of the virtual machine process A is a process allocated to the number 5 memory area corresponding to the memory area of the write command. It can be verified from the file table that block #9 of the disk to be written by the write command is hidden information with respect to all of the processes.

Accordingly, it can be verified from the file table of FIG. 5 and the memory table of FIG. 6 that write (block #9, memory 5) is not an executable command.

In the meantime, when a file is to be modified to prevent modification of the file by a command that does not refer to a memory, whether to modify the file may be determined based on an access right of the file table by referring to only the file table.

For example, if the command is delete and a process cannot be determined by referring to the memory table, the virtual machine monitor 440 may determine whether to execute the command by verifying an access right preset to a corresponding file when the process cannot be determined.

When a process having a right to read a specific file is to read the specific file and to modify the read file on a memory, the virtual machine monitor 440 may verify an access right of the process having with respect to the corresponding file by referring to the file table and may prevent modification on the memory.

If the process has a right to execute a command, the virtual machine monitor 440 executes the command. The virtual machine monitor 440 provides an execution result to the guest operating system 414.

The virtual machine monitor 440 may update the memory table in response to allocation, change, and retrieval of the memory area. When the memory area is allocated, changed, and retrieved, the virtual machine monitor 440 may update the memory table. In addition, when a change occurs in the memory area in response to an operation of an operating system, the virtual machine monitor 440 may update the memory table.

If the process does not have the right to execute the command, the virtual machine monitor 440 blocks an access to the corresponding file.

Here, as a method of blocking the access, the virtual machine monitor 440 may process the file requested by the file I/O command to be displayed as a bad sector, to be displayed as "0", or to represent a protection area.

Hereinafter, a method according to the present disclosure configured as FIG. 4 is described with reference to FIG. 8.

Figure 8:
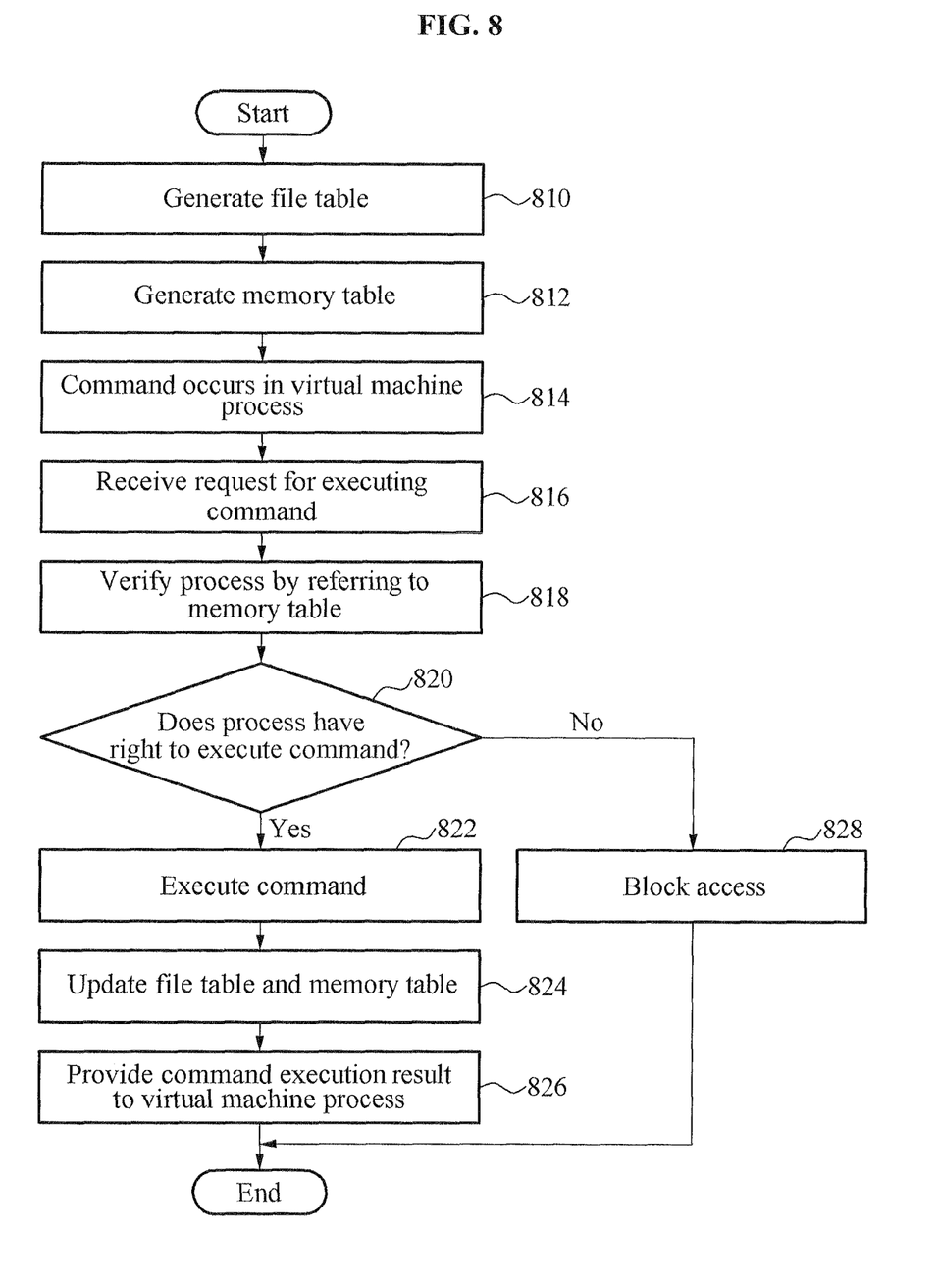
FIG. 8 is a flowchart illustrating a process of monitoring resources of a disk and a memory in a full virtualization system according to an example embodiment.

FIG. 8 is a flowchart illustrating a process of monitoring resources of a disk and a memory in a full virtualization system according to an example embodiment.

Referring to FIG. 8, in operation 810, the full virtualization system generates a file table by parsing file information of files pre-stored on a disk.

In operation 812, when a guest operating system and an application are executed, a virtual machine monitor of the full virtualization system allocates a memory and generates memory information into a memory table.

When a command occurs in the guest operating system or the application in operation 814, the virtual machine monitor receives a request for executing the command in operation 816.

In operation 818, the virtual machine monitor verifies a memory area that the command refers to and verifies a process that is allocated to the memory area by referring to the memory table.

In operation 820, the virtual machine monitor verifies whether the process has a right to execute the command by referring to the file table.

When the process is verified to have the right to execute the command in operation 820, the virtual machine monitor executes the command in operation 822.

In operation 824, if necessary, the virtual machine monitor may update the file table and the memory table.

In response to an occurrence of at least one of addition of a file, deletion of the file, change of the file, change of an access right, and change of process information accessible to the file, the virtual machine monitor may update the file table in operation 824. Also, in response to allocation, change, and retrieval of the memory area, the virtual machine monitor may update the memory table in operation 824. In addition, when a change occurs in the memory area in response to an operation of an operating system, the virtual machine monitor may update the memory table. That is, the virtual machine monitor may update the memory table when the memory area is allocated or retrieved, or when content stored in the memory is modified, and may also update the memory table when a location of the memory area is changed. Accordingly, update of the memory table may be performed at any time in addition to a point in time corresponding to operation 824.

In operation 826, the virtual machine monitor 440 may provide a corresponding result to the guest operating system of the virtual machine process.

When the process is verified to not have the right to execute the command in operation 820, the virtual machine monitor blocks an access to the file.

Here, as a method of blocking the access, the virtual machine monitor may process the file requested by the file I/O command to be displayed as a bad sector, to be displayed as "0", or to represent a protection area.

The method of monitoring resources of the guest operating system in the full virtualization system according to example embodiments may be recorded in non-transitory computer-readable recording media in a form of program instructions executable through a variety of computer devices. The media may include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of the non-transitory computer-readable media include magnetic media such as hard disks, floppy disks, and magnetic tape; optical media such as, CD-ROM and DVD; magneto-optical media such as optical media and floptical disks; and hardware devices that are specially configured to store and perform program instructions, such as ROM, RAM, flash memory, and the like. Examples of program instructions include both machine code, such as produced by a compiler a high language code that may be executed by the computer using an interpreter. The above-described hardware devices may be configured as one or more software modules in order to perform the operations of the example embodiments, or vice versa.

Although the description is made with reference to some example embodiments and drawings, they are provided only to assist in a comprehensive understanding of the present disclosure. Thus, the present disclosure is not limited to the example embodiments and it will be apparent to those skilled in the art that various modifications and changes may be made from the description.

Therefore, the scope of the disclosure is defined not by the example embodiments but by the claims and their equivalents, and all variations within the scope of the claims and their equivalents are to be construed as being included in the disclosure.

What is claimed is:

1. A method of monitoring resources in a full virtualization system, the method comprising:
generating a file table by parsing file information, wherein the file table includes the file information and a right to access each piece of the file information, wherein the right to access comprises: read/write access, read access, and hidden access;

requesting a virtual machine monitor to execute a file input/output (I/O) command in response to an occurrence of the file I/O command in a guest operating system or an application; and verifying whether a file requested by the file I/O command is accessible by referring to the file table;

wherein the verifying comprises emulating the file I/O command to a format that is verifiable by the virtual machine monitor through an emulator;

executing the file I/O command when the file requested by the file I/O command is verified to be accessible; and, blocking an access when the file requested by the I/O command is verified to be inaccessible;

wherein the blocking comprises processing the file requested by the file I/O command to be displayed as a bad sector, to be displayed as "0", or to represent a protection area.

2. The method of claim 1, wherein the file information is at least one of path information of the file, a block number, and i-node information.

3. The method of claim 1, further comprising:
updating the file table in response to an occurrence of at least one of addition of the file, deletion of the file, change of the file, and change of an access right.

4. A non-transitory computer-readable recording medium storing a program to implement the method of claim 1.

5. A method of monitoring resources in a full virtualization system, the method comprising:

generating a file table by parsing file information, wherein the file table includes the file information, accessible process information, and an access right, wherein the access right comprises: read/write access, read access, and hidden access;

generating a memory table when allocating a memory;

requesting a virtual machine monitor to execute a command in response to an occurrence of the command in a guest operating system or an application;

verifying a memory area that the command refers to and verifying a process allocated to the verified memory area from the memory table; and verifying whether the process has a right to execute the command by referring to the file table;

wherein the verifying comprises emulating the file I/O command to a format that is verifiable by the virtual machine monitor through an emulator;

executing the file I/O command when the file requested by the file I/O command is verified to be accessible; and, blocking an access when the file requested by the I/O command is verified to be inaccessible;

wherein the blocking comprises processing the file requested by the file I/O command to be displayed as a bad sector, to be displayed as "0", or to represent a protection area.

6. The method of claim 5, wherein the file information is at least one of path information of the file, a block number, and i-node information.

7. The method of claim 5, wherein the memory table includes virtual machine information, process information, and the memory area allocated to the process.

8. The method of claim 5, further comprising:
executing the command when the process is verified to have the right to execute the command.

9. The method of claim 5, further comprising:
blocking an access when the process is verified to not have the right to execute the command.

10. The method of claim 5, further comprising:
updating the file table in response to an occurrence of at least one of addition of the file, deletion of the file, change of the file, change of an access right, and change of accessible process information.

11. The method of claim 5, further comprising:
updating the memory table in response to allocation, change, and retrieval of the memory area.

12. A non-transitory computer-readable recording medium storing a program to implement the method of claim 5.

13. An apparatus for monitoring resources in a full virtualization system, the apparatus comprising: a processor
a file generator configured to generate a file table by parsing file information, wherein the file table includes the file information and a right to access each piece of the file information, wherein the right to access comprises: read/write access, read access, and hidden access;

a virtual machine process configured to request a virtual machine monitor to execute a file input/output (I/O) command in response to an occurrence of the file I/O command in a guest operating system or an application; and the virtual machine monitor configured to verify whether a file requested by the file I/O command is accessible by referring to the file table;

wherein the virtual machine is configured to:

verify by emulating the file I/O command to a format that is verifiable by the virtual machine monitor through an emulator;

to execute the file I/O command when the file requested by the file I/O command is verified to be accessible;

to block an access when the file requested by the I/O command is verified to be inaccessible, and to block an access by processing the file requested by the file I/O command to be displayed as a bad sector, to be displayed as "0", or to represent a protection area.

* * * * *